May 16, 1939.  R. C. HOYT  2,158,699

BRAKE MECHANISM

Filed Jan. 8, 1936  2 Sheets-Sheet 1

INVENTOR
R. C. HOYT
BY HIS ATTORNEYS
Merchant, Kilgore & Perry

May 16, 1939.  R. C. HOYT  2,158,699
BRAKE MECHANISM
Filed Jan. 8, 1936  2 Sheets-Sheet 2
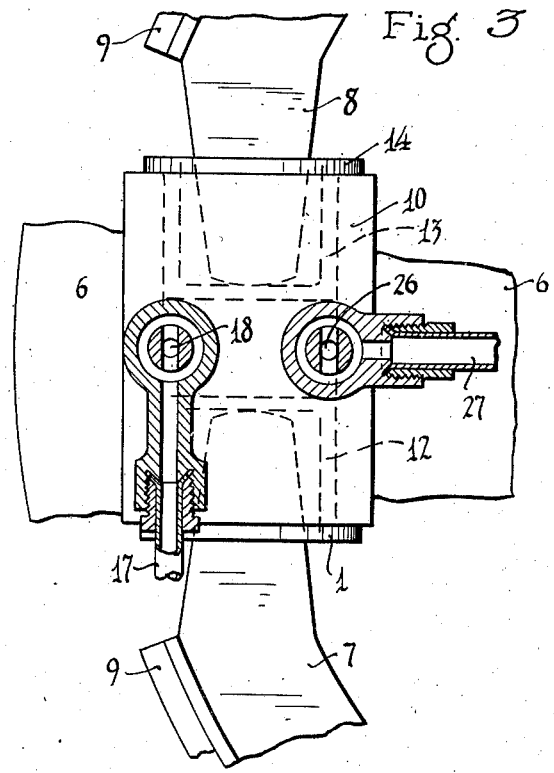
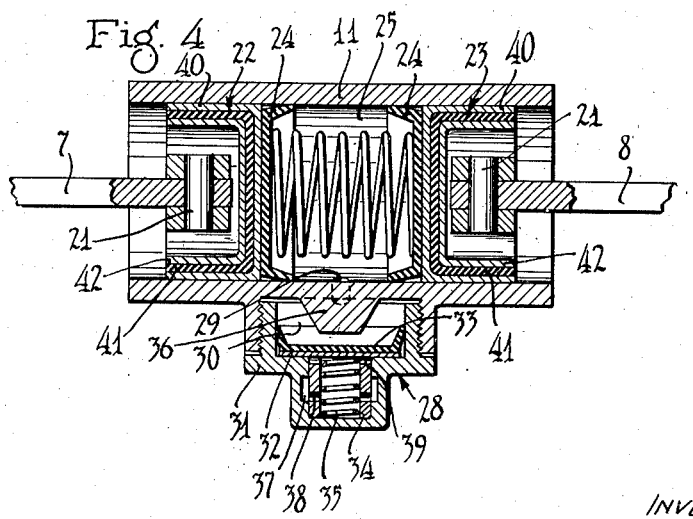
INVENTOR
R. C. HOYT
BY HIS ATTORNEYS
Merchant, Kilgore + Perry Patented May 16, 1939

2,158,699

UNITED STATES PATENT OFFICE 2,158,699

BRAKE MECHANISM

Roy Corwin Hoyt, Duluth, Minn.

Application January 8, 1936, Serial No. 58,114

10 Claims. (Cl. 188—152)

My invention relates to improvements in friction brake mechanisms of the general character employed in connection with automobiles and other motor-propelled vehicles, and has as its principal object to provide a simple and highly efficient brake mechanism of this character in which certain of the brake elements will be automatically adjusted to compensate for wear.

As is well known, those brake mechanisms most commonly employed on the wheels of automobiles and like vehicles include a brake drum that rotates with an associated wheel, and one or more segmental friction shoes normally disposed in close spaced relation to the drum and associated with suitable actuating mechanism for moving the shoe or shoes into frictional braking engagement with the brake drum. In all such brakes, it is necessary, in order to obtain maximum braking efficiency from any one friction shoe, that a maximum possible area of that particular shoe be brought into frictional engagement with the brake drum under braking pressure, and, since this condition is dependent on proper adjustments of the parts according to the ever changing condition of the wearing friction elements, it has become common practice to provide such brake mechanisms with means for manually adjusting the parts to compensate for wear.

With these old style brake mechanisms, manual adjustment of the brakes is too time-consuming and costly an operation to permit of readjustment at sufficiently frequent intervals to keep the brakes operating even close to maximum efficiency, and therefore it has become customary practice to readjust the same at intervals determined by minimum tolerable efficiency of braking action, and although in well designed mechanisms of this kind, the brakes, if in good condition, can usually be adjusted to operate with a high degree of efficiency immediately following an adjustment, the efficiency tapers off rapidly under continued use and the average efficiency for periods between adjustments is some place between good and poor. This is obviously objectionable, firstly, because of the time and expense involved in making periodical manual adjustments; secondly, because of the poor average operating efficiency of the brakes; and thirdly, because imperfectly adjusted brakes wear rapidly.

It is the purpose of the instant invention to provide a brake mechanism of the general character described in which certain adjustments of the parts that are essential for maximum braking efficiency of a brake shoe or shoes will be brought about automatically and at such frequent intervals that the shoe or shoes will be operated at maximum efficiency at all times throughout the useful life of the friction surfaces. Obviously, such a brake as this will not only have the advantage of greatly improved average operating efficiency, but will have the further advantages of saving time and money ordinarily consumed in manual adjustments. Also, the essential parts, being maintained in correct adjustment at all times, will wear much longer than those in ordinary brakes where the parts are out of correct adjustment much and often most of the time.

In accordance with this invention, I provide means for automatically adjusting and readjusting the essential parts of the brake to compensate for wear, and in the form thereof here illustrated, the adjustment of the parts is automatically checked and automatically readjusted, if necessary, once for each brake operation, this checking and readjusting of the shoes being brought about as a result of application of brake-operating pressure and occurring prior to each braking action.

The above noted and other important objects and advantages of the invention will be made apparent from the following specification, drawings and claims.

Whereas the invention is disclosed and broadly claimed herein, certain modifications thereof are disclosed and broadly claimed in a companion application filed of even date herewith under Serial No. 58,115.

In the accompanying drawings, wherein like characters indicate like parts throughout the several views, the invention is illustrated in connection with a brake mechanism of the hydraulic pressure-operated type.

Referring to the drawings:

Fig. 3 is an enlarged detail view taken on the line 3—3 of Fig. 2; and

Fig. 4 is an enlarged detail view taken on the line 4—4 of Fig. 2.

Figure 1:
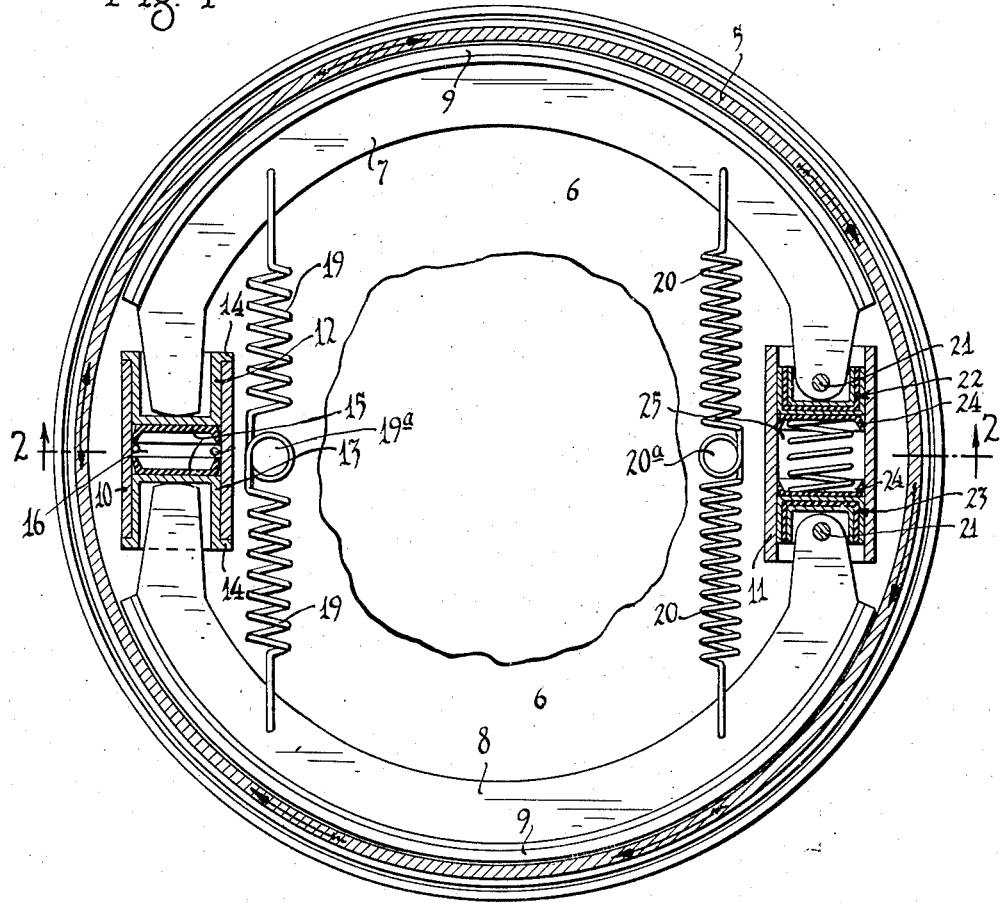
Fig. 1 is a vertical sectional view taken approximately on the line 1—1 of Fig. 2.
Figure 2:
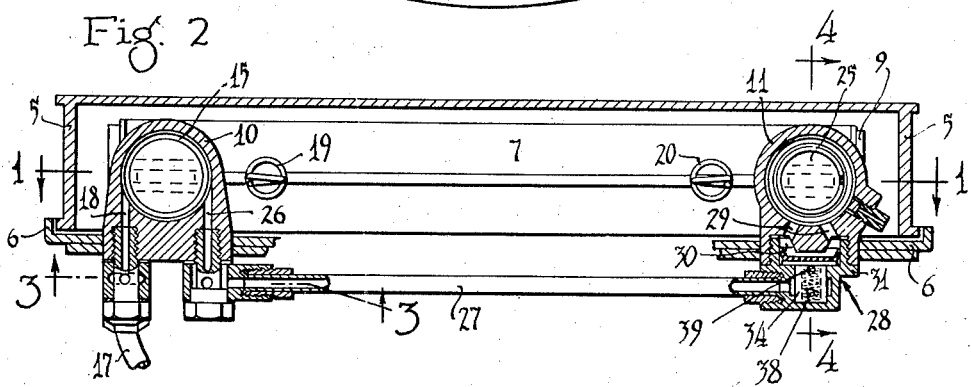
Fig. 2 is an axial sectional view taken on the line 2—2 of Fig. 1 and looking upwardly in respect to Fig. 1.

The brake drum, which is of the usual character and may be assumed to be carried by and be co-axial with a vehicle wheel, is indicated by 5, and the usual type carrier plate, which closes the open side of the brake drum and may be assumed to be mounted in the usual manner on a fixed part of the vehicle, such as a stationary part of the axle structure, is indicated by 6. Disposed in opposed relation within the drum 5 is a pair of segmental brake shoes 7 and 8, that are provided with suitable drum-engaging facings, which facings, together with the drum 5, constitute the friction elements of the brake.

The mechanism for operating the brake shoes from hydraulic pressure includes fixed cylinders 10 and 11, the former being rigidly anchored to the carrier plate 6 intermediate the opposed left-hand ends, with respect to the drawings, of the shoes 7 and 8 and the latter being rigidly mounted on the carrier plate or flange 6, intermediate the opposed right-hand ends of the brake shoes 7 and 8. The cylinder 10 is provided with an opposed pair of pistons 12 and 13 that are flanged at their open ends to provide cylinder end engaging stop shoulders 14 and are provided at their inner ends with opposed fluid sealing cups 15 of rubber or other suitable resilient material. The cups 15 are always spaced apart within the cylinder 10 and the space between said cups within the cylinder affords a fluid expansion chamber 16 that is adapted to be supplied with fluid under pressure from a suitable source, such as the customary master cylinder, not shown, through connections including a conduit 17 and a passage 18 through the wall of the cylinder.

The opposed projecting left-hand ends of the shoes 7 and 8 work in the pistons 12 and 13, respectively, and are held retracted against the closed ends of the said pistons 12 and 13 by means of shoe-retracting springs 19 and 20, which springs are connected between the opposed shoes near opposite ends thereof. It will be understood, of course, that the left and right-hand ends of the shoes will be affected mainly by the spring 19 or 20 located in the closest proximity thereto. The right-hand ends of the shoes 7 and 8 are pivotally anchored at 21, the former in a piston 22 and the latter in a piston 23. The pistons 22 and 23, which are alike and work in opposed relation in the cylinder 11, are provided at their opposed closed ends with fluid sealing cups 24 of rubber or other suitable resilient material.

By means hereinafter described, the cup-equipped ends of the pistons 22 and 23 are maintained in spaced relation against the action of the shoe-retracting springs 19 and 20. The portion of the cylinder 11 between the pistons 22 and 23 forms an expansion chamber 25 which is supplied with fluid from the same source as the expansion chamber 16 of cylinder 10, through a fluid passage 26 from the expansion chamber of cylinder 10, a connecting conduit 27, a novel and highly important fluid measuring and check valve mechanism 28, and ports 29 leading from the chamber 30 of the fluid measuring valve mechanism 28 to the expansion chamber of cylinder 11.

The measuring and check valve mechanism 28 is incorporated within a plug-like fitting 31 that is screw-threaded into a wall of the cylinder 11 and includes a disc-like valve head 32 working in the valve chamber 30 and carrying a resilient inwardly flanged sealing cup 33. The disc-like valve head 32 is formed integrally with a reciprocatory stem 34, which stem is tubular, open at its outer end, and contains a coil compression spring 35 that maintains the valve head 32 and its stem under pressure to move against an axially projecting stop lug 36 within the valve chamber 30. Fluid from the conduit 27 reaches the valve chamber 30 through an internal annular groove 37 in the plug 31 surrounding the valve stem 34, apertures 38 in the tubular valve stem 34 that are always in register with the annular groove 37, perforations 39 in the tubular valve stem, and from thence to the chamber 30 by making its way between the disc-like valve head and its attached resilient inwardly flanged cup 33 and the walls of the plug. Initial movement of a column of fluid toward the cylinder expansion chamber 25 results in movement of the cup equipped valve head 32 against the stop 36, and any further movement of the fluid is past the valve head 32 and cup 33.

When pressure on the column of fluid is released, only such a limited and measured volume of fluid will be released from the cylinder expansion chamber 25 into the measuring valve chamber 30 as is required to move the cup-equipped valve head 32 back to its other extreme or full line position, and hence, it will be seen that the right-hand ends of the shoes 7 and 8, after once being forced against the drum by fluid pressure working on the pistons 22 and 23, will be permitted to recede from positions of engagement with the drum only to the limited and measured extent permitted by the measuring valve mechanism 28, and thereafter the entrapped fluid in the expansion chamber 25 will afford a solid and substantially unyielding base of reaction for the piston-equipped right-hand ends of the shoes.

The pistons 22 and 23 each comprise an outer cup-like shell 40, an inner cup-like shell 42, and an interposed rubber cup 41 that securely anchors the cups 40 and 42 against separation, but permits slight lateral movement of the inner cup 41 in respect to the outer cup. It is important to note that the brake shoes are pivotally anchored at 21 directly to the inner cup bodies 42 and to the outer cup-like bodies 40 only through the medium of the interposed rubber cup.

Before proceeding with the description of the operation of the apparatus, attention is called to the following facts, to wit:

1. That the parts of the brake are shown in their normal inoperative or brake-released positions;

2. That, whereas no fluid is indicated in the system, the parts are positioned as if and it should be assumed that the system were filled with fluid but that no brake-actuating pressure was being applied to the fluid;

3. That the brake-shoe-retracting spring 19 is somewhat heavier and stronger than the spring 20;

4. That the cylinders 10 and 11 are of like diameters;

5. That the cup-equipped measuring valve head 32 follows the movement of the column of fluid within the limits of its confines, freely passes fluid in the direction of the cylinder expansion chamber 25 after it reaches its innermost limit, and positively stops outward flow of fluid after it becomes seated in its outermost position and, hence, serves to measure and limit, to the measured amount, outward flow of fluid from the expansion chamber 25; and 6. That the springs 19 and 20 are intermediately anchored at 19a and 20a, respectively, to the fixed flange 6, this being especially important in connection with spring 20, since the opposite halves of the spring 20 afford the sole means of normally maintaining the right-hand ends of the shoes centered with respect to the drum.

7. That the sealing-cup-equipped valve head 32 is subject to the relatively very light yielding pressure of the spring 35 to move to its inner extreme position but is normally retained in its outer extreme position by the relatively very great retracting force of the shoe-retracting spring 20 acting thereon, in opposition to the spring 35, through the sealing-cup-equipped pistons 22 and 23 and the column of fluid entrapped between said pistons and the valve head. The spring 35, thus working in opposition to the shoe-retracting spring 20, at all times causes a somewhat higher fluid pressure to be maintained on the inner side of the sealing-cup-equipped valve head 32 than on the outer side of said valve head, and this unequal pressure on opposite sides of the sealing-cup-equipped valve head maintains the flanges of the sealing-cup 33 thereof in tight sealing contact with the walls of the valve chamber 32 during the operation cycle when the valve head and its sealing-cup are moved with the column of fluid from their inoperative outer positions, shown in the drawings, to their opposite or inner extreme positions, during which time the sealing-cups 33 would otherwise be floating with equal pressure on opposite sides thereof.

*Operation*

Assuming that the vehicle is moving in a forward direction and that the direction of rotation of the drum is clockwise, as indicated by arrows on the drum, the operation of the mechanism will be substantially as follows:

When the column of fluid in the system is placed under braking pressure through the medium of the master cylinder or other pressure-producing device connected to the conduit 17, an equal pressure will be created in the expansion chambers 16 and 25 of cylinders 10 and 11, respectively. In this direction of rotation of the drum, the shoe 7 will function as the primary brake shoe. The spring 19, being stronger than the spring 20, will delay outward movement of the left-hand ends of the brake shoes 7 and 8 until a resistance has been built up against outward movement of the pistons 22 and 23 of the cylinder 11, and the resultant increase in fluid pressure is sufficient to overcome said spring. Initial movement of the column of fluid, will, therefore, cause no movement of the pistons 12 and 13 of the cylinder 10, but will move into the expansion chamber 25 of cylinder 11 and cause simultaneous outward movement of the piston-equipped right-hand ends of the shoes 7 and 8 into contact with the rotating drum while the left-hand ends of the shoes 7 and 8 are still in their normal released positions, as shown in the drawings. The right-hand end of the shoe 8 and the left-hand end of shoe 7, in this direction of drum rotation, becomes the toes of the shoes, and the right-hand end of the shoe 7 and the left-hand end of the shoe 8 become the heels. The shoe 8, due to the frictional load picked up immediately upon engagement thereof with the drum, immediately becomes set and the said frictional load prevents, even under further application of fluid pressure in the cylinders 10 and 11, the piston 13 from moving off of its seat. As soon as the right-hand ends of the shoes 7 and 8 are moved into contact with the rotating drum, the pistons 22 and 23, being stopped against further outward movement, greater pressure is immediately built up in the expansion chamber 25 of cylinder 11 than is then existent in the expansion chamber 16 of cylinder 10, thus increased pressure now being enough to overcome the greater strength of spring 19 than that of spring 20 and permit outward movement of piston 12 until the left-hand or toe end of shoe 7 engages the rotating drum. As soon as the left-hand or toe end of the shoe 7 engages the rotating drum, the shoe 7 will pick up a high frictional load, which will tend to rotate the shoe in the direction of drum rotation, and this tendency will immediately build up a much greater pressure in the expansion chamber 25 of cylinder 11 than exists in the expansion chamber 16 of cylinder 10, this being due to the fact that the frictional load of the shoe 8 is carried by engagement of the flanged end 14 of piston 13 with the fixed cylinder 10, whereas the frictional load of the shoe 7 is applied through the piston 22 directly to fluid within the expansion chamber 25 of the cylinder 11. Under this unequally high pressure in expansion chamber 25 of cylinder 11, fluid will be discharged from the expansion chamber 25 through the measuring valve mechanism 28 to the extent required to move the cup-equipped valve head 32 from its inner extreme position back to its normal outer extreme position, and then the balance of fluid within the expansion chamber 25 of cylinder 11 will be positively entrapped. This small measured escape of fluid from the expansion chamber 25 of cylinder 11 will, however, permit the right-hand or heel end of the shoe 7 to retract to a position slightly beyond its normal inoperative position, wherein it is spaced from the drum a minimum permissible distance, and thereafter the brake drum, acting through the medium of the shoe 8 and its piston 23, serves as a base of reaction.

In other words, from this point on, during the balance of the braking period, the frictional load picked up by shoes 7 and 8 is accumulatively applied to the secondary shoe 8 although the primary shoe 7 is affected only by its own frictional load. The pistons 22 and 23, while substantially unyielding under axial pressure, will yield slightly in a lateral direction under lateral pressure, and this permits the shoes 7 and 8, which are always very nearly centered, to find their exact centers under braking action, and this is important from the standpoints of maximum braking efficiency and long life of the facings 9 and drum 5.

When the fluid in the system is released from brake-actuating pressure, the left-hand or toe end of the shoe 7 will be retracted by its section of spring 19 to its normal inoperative position wherein the stop shoulder 14 of the piston 12 engages the end of the cylinder 10, as shown in the drawings. The left-hand or heel end of the shoe 8, being already retracted to its normal position during the braking action under forward movement, will remain as is. The toe end of the shoe 7 being now retracted out of engagement with the drum, the shoe 7 will be relieved of most of its frictional load and the resilient rubber center of piston 22 will shift the same laterally out of engagement with the drum, and now that the entire load of fluid pressure applied to the toe end of the shoe 8 is relieved, said shoe will move out of engagement with the brake drum, and the right-hand ends of both the shoes 7 and 8 will become vertically centered with respect to the drum by means of their respective sections of the spring 20, it being understood that the spacing between the right-hand ends of the shoes 7 and 8 only and not the vertical positions thereof is determined by the fluid entrapped in the cylinder 11 between the pistons 22 and 23.

From the foregoing description, it should be evident that the right-hand or heel end of the primary brake shoe 7 is always automatically properly adjusted with respect to the drum during a braking operation, and that this adjusting of the heel of the shoe 7 is brought about by application of braking pressure on the fluid in the system, occurs prior to actual setting of the brake shoe for effective braking action, and is the result of first moving the heel of the shoe 7 into contact with the drum by application of fluid pressure, and then permitting retraction of the heel and its piston 22 to just the desired point by permitting a discharge from the expansion chamber 25 of cylinder 11 of only a measured amount of fluid. Obviously, wear of the friction surfaces will be compensated for each time braking action occurs by leakage of a little additional fluid into the chamber 25 of cylinder 11 past the valve head 32.

In this case, as in the field, the end of the brake shoe which is moved outward to create the braking action, is referred to as the toe end and the end of the shoe which works against a base of reaction, under the combined action of brake-applying pressure and frictional load picked up from the brake drum, is referred to as the heel end of the shoe. It is well understood that the positioning of the heel end of a brake shoe is most important for highly effective and efficient braking action, and that this positioning during the braking period should be as close as possible to the drum and preferably in contact with the drum. With the arrangement described, not only is the heel of the brake shoe 7 primarily positioned in very close relation to the drum during the primary stage of the braking period, but due to the slight lateral resilience of the piston structure 22, the shoe is subsequently permitted to shift to a point of exact center under the frictional load, so that the heel will be in effective braking contact during the major portion of braking operation, and will spring back to its normal position upon releasing of the brake. Of course, this ability of the shoe 7 to center under braking load applies also to the shoe 8. It will also be evident that the heel end of the shoe 7 will always be adjusted alike for each braking action and that on a vehicle having like brakes on four of its wheels, for example, the shoes 7 of all the brakes would be maintained in like adjustment for each braking period, thereby removing all problems of equalization of the several brakes as far as the shoes 7 are concerned.

Whereas the secondary brake shoe 8 does not, when the vehicle is travelling in the forward direction as described, have the advantage of a self or automatically adjusting heel and will not, therefore, be as effective as the shoe 7 for an equal pressure exerted on either thereof, the shoe 8 does, nevertheless, have the advantage of greater applied pressure due to the fact that the frictional load picked up by the primary shoe 7 is transferred directly to the toe end of the shoe 8. The shoe 8 does, however, have the advantage of having its toe end always maintained in desired close relation to the drum, and if there are several of these brakes on a vehicle, and if the heels are all adjusted alike in respect to the drum, they will wear alike and therefore not cause any serious problems of equalization.

It will readily be seen that when the vehicle is run in reverse, in which case the brake drum will revolve in a counterclockwise direction and opposite to that indicated by the arrows in the drawings, the shoe 8 will become the primary shoe and the shoe 7 will become the secondary shoe and the previously named heel and toe ends of the shoes will function in reverse order. In reverse, this brake will function just as efficiently as in a forward direction.

In practice, I prefer to employ a softer brake facing on the shoe 7 than on the shoe 8, the reason for this being that in a forward direction of rotation, the facing 9 of the shoe 8 will be worked under greater pressure and have less of its surface in contact with the drum than will the facing of the shoe 7.

What I claim is:

1. In a friction brake mechanism, the combination with a brake drum and a plurality of segmental brake shoes positioned in circumferentially spaced relation within the drum, of means interposed between each of the adjacent ends of the opposite shoes for applying outward expanding pressure thereto, yielding means tending to retract opposite ends of the shoes, means for positively limiting retracting movements of one end of each shoe, to a certain definite point, under the action of said yielding means, and automatic means for adjustably limiting retracting movements of the other end of each shoe.

2. The structure defined in claim 1 in which the said automatic adjusting mechanism is operatively associated with the brake shoe and is responsive to brake shoe operation to adjust and readjust the said adjustable limiting means.

3. In a fluid pressure operated brake mechanism, a brake drum and an oppositely disposed pair of segmental brake shoes disposed within the brake drum, of yielding means tending to retract the shoes away from the drum, means limiting retracting movements of one end of each shoe to a certain definite position, and fluid pressure-operated means for forcing the other end of each shoe into frictional engagement with the drum, said last named means including at least one fluid expansion chamber, a source of fluid pressure, and valve means permitting free flow of fluid into the said at least one expansion chamber but operating to automatically cut off the flow of fluid from the at least one expansion chamber after and only after a desired measured quantity thereof has been expelled.

4. In a fluid pressure operated friction brake mechanism, a brake drum and an oppositely disposed pair of segmental brake shoes disposed within the brake drum, a pair of fixed cylinders each disposed between adjacent ends of the opposed shoes, a pair of pistons working in spaced relation in each cylinder and each operatively engaging an end portion of a brake shoe, yielding means tending to retract the shoes and pistons, a source of fluid pressure connected to the cylinder expansion chambers between the pistons, mechanical stops for limiting retracting movements of the ends of the opposite shoes associated with one of the cylinders, and automatic valve means associated with the expansion chamber of the cylinder associated with the other ends of the brake shoes for limiting the volume of fluid discharged from that expansion chamber to predetermined measured quantity, but permitting free flow of fluid into that expansion chamber.

5. The structure defined in claim 4 in which the last referred to end of at least one of the shoes is anchored to the cylinder-engaging wall of its co-operating piston through a laterally resilient but axially substantially rigid connection.

6. The structure defined in claim 4 in which at least one of the pistons of the last referred to cylinder is made up of circumferentially spaced rigid inner and outer cylindrical bodies and an intermediate resilient body, and in which the co-operating shoe end is anchored to the inner rigid cylindrical body.

7. In a fluid pressure operated friction brake mechanism, a brake drum and an oppositely disposed pair of segmental brake shoes disposed within the brake drum, a pair of fixed cylinders each disposed between different adjacent ends of the opposed shoes, a pair of pistons working in spaced relation in each cylinder and each operatively engaging an/end portion of a brake shoe, mechanical stops limiting retracting movements of the ends of the opposite shoes associated with one of the cylinders, automatic valve means associated with the expansion chamber of the cylinder associated with the other ends of the brake shoes for limiting the volume of fluid discharged from that expansion chamber to a pre-determined measured quantity but permitting free flow of fluid into that expansion chamber, a yielding means tending to retract the ends of the shoes and co-operating pistons associated with the last named cylinder, a yielding means for retracting the other ends of the shoes, said last noted yielding means exerting greater retracting force on their respective ends of the shoes than the other said yielding means does on the opposite ends of the shoes.

8. In a fluid pressure operated friction brake mechanism, a brake drum and an oppositely disposed pair of segmental brake shoes disposed within the brake drum, a pair of fixed cylinders each disposed between different adjacent ends of the opposed shoes, a pair of pistons working in spaced relation in each cylinder and each operatively engaging an end portion of a brake shoe, mechanical stops limiting retracting movements of the ends of the opposite shoes associated with one of the cylinders, automatic valve means associated with the expansion chamber of the cylinder associated with the other ends of the brake shoes for limiting the volume of fluid discharged from that expansion chamber to a predetermined measured quantity but permitting free flow of fluid into that expansion chamber, a yielding means exerting retracting pressure on both ends of each shoe and the co-operating pistons and arranged to exert greater retracting force on the ends of the shoes and pistons associated with the last named cylinder.

9. In a friction brake mechanism, the combination with a rotary brake drum and a plurality of non-rotary segmental brake shoes disposed in circumferentially spaced relation adjacent the drum, of yielding means tending to retract both ends of each shoe out of engagement with the drum, means for moving opposite ends of each shoe into frictional engagement with the drum to set the brake, means for limiting retracting movements of one end of each shoe to a definite predetermined position, and automatically adjustable means for limiting retracting movements of the other end of each shoe to positions determined by the condition of the friction surfaces and wherein the drum-engaging friction portion of that end of each shoe is a predetermined definite distance from the drum.

10. In a friction brake mechanism, the combination with a rotary brake drum and a plurality of non-rotary segmental brake shoes disposed in circumferentially spaced relation adjacent the drum, of yielding means tending to retract both ends of each shoe out of engagement with the drum, means for moving opposite ends of each shoe into frictional engagement with the drum to set the brake, means for limiting retracting movements of one end of each shoe to a definite predetermined position, and automatically adjustable fluid pressure operated means for automatically adjustably limiting retracting movements of the other end of each shoe to a position a predetermined definite distance from the drum.

ROY CORWIN HOYT.